No. 891,398. PATENTED JUNE 23, 1908.
G. F. BRETTELL.
GREASE CUP.
APPLICATION FILED NOV. 12, 1907.
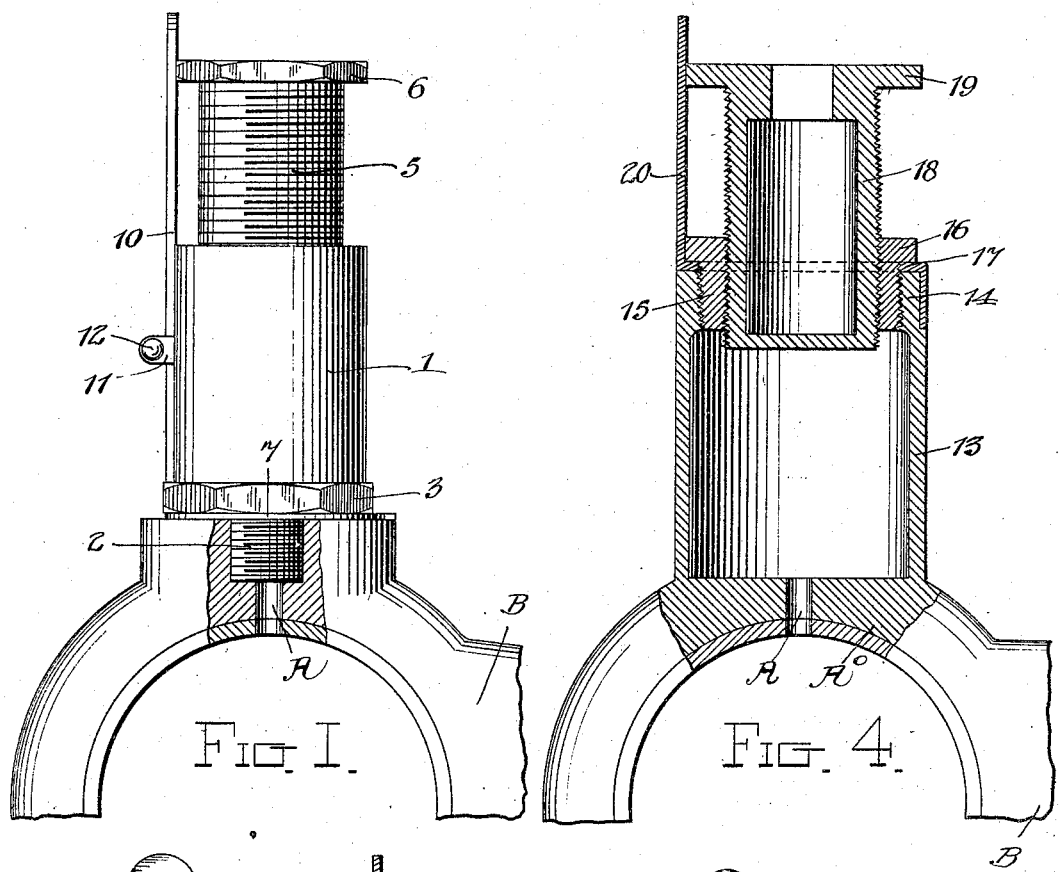
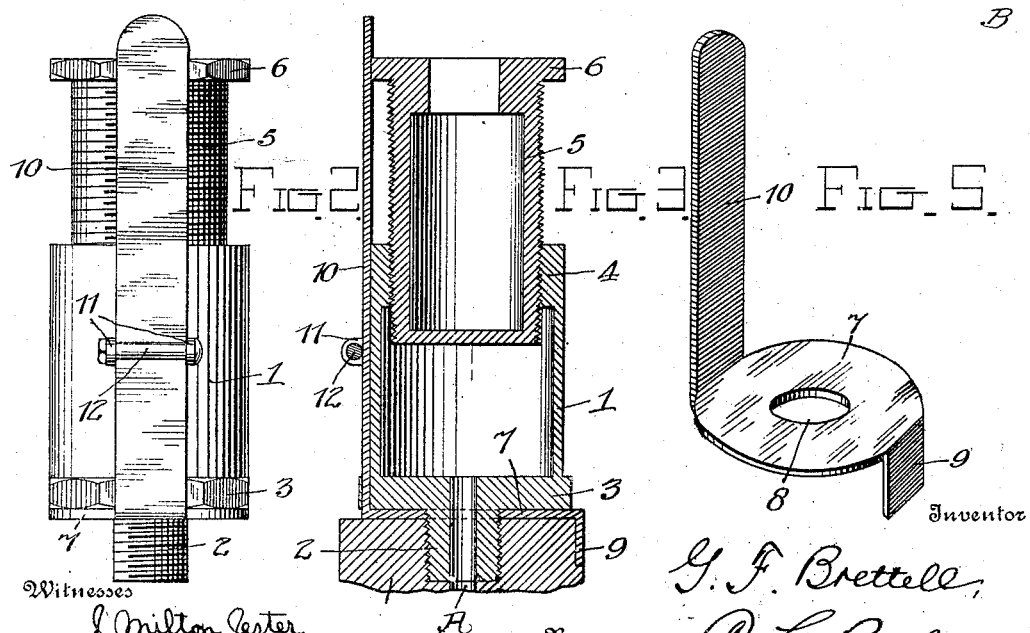

UNITED STATES PATENT OFFICE.

GEORGE F. BRETTELL, OF SHAWNEE, OKLAHOMA.

GREASE-CUP.

No. 891,398.  Specification of Letters Patent.  Patented June 23, 1908.

Application filed November 12, 1907. Serial No. 401,838.

*To all whom it may concern:*

Be it known that I, GEORGE F. BRETTELL, a citizen of the United States, residing at Shawnee, in the county of Pottawatomie and State of Oklahoma, have invented certain new and useful Improvements in Grease-Cups, of which the following is a specification.

My invention relates to grease cups and particularly contemplates the provision of a simple and inexpensive device of this character comprising a shell adapted to contain a lubricant and a follower worked in such shell to force the lubricant therefrom, in combination with improved means to control the movement of said follower.

My invention further and specifically resides in the following features of construction, arrangement and operation, as will be hereinafter described with reference to the accompanying drawings, forming a part of this specification, in which like numerals are used to designate like parts throughout the several figures, and in which Figure 1 is an elevation of my improved oil cup showing the same attached upon a crank adjacent its bearing, said crank being partly in section, Fig. 2 is an elevation of my improved grease cup detached, Fig. 3 is a central vertical sectional view taken therethrough and through a portion of the crank to which it is attached, Fig. 4 is a view partly in elevation and partly in section embodying a slightly modified form of my improved invention, and Fig. 5 is a perspective view of the spring holder.

In the practical embodiment of my invention I provide a grease cup comprising a shell 1 adapted to contain the lubricant and provided with a threaded nipple 2 extending centrally from the base thereof, the said nipple being provided with an opening extending centrally therethrough and through the base of the shell 1, and adapted to be alined with an opening A through the bearing portion of a crank or the like B, when said threaded nipple 2 has been screwed within an opening formed adjacent to said opening A. A shell 1 is further formed with a nut 3 upon its circumferential face adjacent the base thereof and with an elongated upper edge 4 internally threaded adjacent the bore of said shell, for the reception of the external threaded body portion of the screw follower 5, preferably formed hollow in order to lighten the same and provided with a flange 6 extending from its outer edge and provided with a plurality of flat sides to form a nut.

In order to prevent accidental rotation of the plug or screw follower 5 I provide a spring holder comprising a circular body portion 7 having a central opening 8 therethrough adapted to be held between the nut 3 at the base of the shell 1 and the portion of the bearing of the crank B surrounding its opening into which the threaded nipple 2 is screwed said spring holder being provided with a clip 9 adapted to be bent upon a portion of said crank B if desired. The spring holder is further provided with an elongated spring tongue 10 bent upwardly therefrom, and to lie along the body portion of the shell 1, the nut 3 at the base thereof being provided with a cut out portion to allow said spring tongue 10 to lie in close contact with said shell 1.

The tongue 10 extends above the shell 1 and is adapted adjacent its free end to successively engage the flat surfaces of the nut 6 of the plug or screw follower 5 as the same is rotated within the shell 1 to force the lubricant therefrom, said tongue 10 thus acting as a lock against said flat faces of said nut 6 to prevent accidental rotation of said screw follower 5. To prevent the spring tongue 10 being permanently sprung away from the nut 6 by hard and continued use, I provide the shell 1 with a pair of ears 11 extending outwardly therefrom at the sides of said tongue and form a bolt or pin 12 extending between said ears over the outer face of said tongue 10, thereby securely holding the same above its point of bending from its circular body portion 7.

In the form of my invention shown in Fig. 4 I provide a shell 13, adapted to contain a lubricant, formed integral with the bearing portion A of a crank B and provided with an internally threaded thickened outer edge adapted for the reception of an internally and externally threaded plug or reducing nut 15 having a flange 16 between which and said outer edge 14 of the shell 13 is clamped the circular body portion 17 of a spring holder of substantially the same construction as the holder previously described and shown in Fig. 5. In this form a plug or screw follower 18 is of substantially the same formation as the follower 5 previously described, being provided with a nut 19 at its upper edge the flat surfaces of which are adapted to be engaged by a spring tongue 20 extending from the plate 17 and of substantially the same formation or of greatly reduced length as will be seen. In this form the holder, comprising the ears 11 and the bolt or pin 12 extending from the shell 1, is dispensed with, the operation, however, being substantially the same in both forms illustrated and described.

Having thus fully described my invention, I claim:

A grease cup of the character described comprising a shell having a threaded nipple for engagement with a support and provided with a nut formed thereon adjacent its lower end, having a recess in one of its flat surfaces, a follower threaded to screw with said shell and comprising a hollow body portion provided on its outer end with an enlarged nut having its flat surfaces in alinement with the surface of said shell, a spring holder comprising a body portion clamped between said shell and its support, a spring retaining clip extending from said body portion and bent into engagement within a recess formed therefor, a spring locking tongue extending from said body portion at a diametrically opposite point to said clip, and bent to lie within said recess in said body nut and to engage the flat surfaces of said follower nut with its free end, said shell having pierced ears extending therefrom at the sides of said tongue, and a pin extending between and secured through said ears to prevent displacement of said tongue, substantially as described.

In testimony whereof I affix my signature in presence of two witnesses.

GEORGE F. BRETTELL.

Witnesses:
W. M. ENGART,
T. J. HERON.